E. J. METZGER & J. A. MOORE.
CLAMP STIRRUP.
APPLICATION FILED NOV. 27, 1908.
949,241.
Patented Feb. 15, 1910.
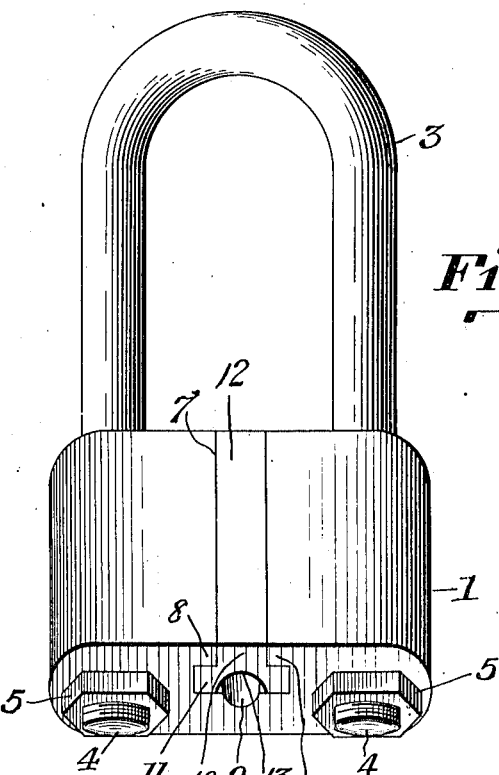

UNITED STATES PATENT OFFICE.

EDWARD J. METZGER AND JOHN A. MOORE, OF COPAN, OKLAHOMA.

CLAMP-STIRRUP.

949,241.  Specification of Letters Patent.  Patented Feb. 15, 1910.

Application filed November 27, 1908. Serial No. 464,790.

*To all whom it may concern:*

Be it known that we, EDWARD J. METZGER and JOHN A. MOORE, citizens of the United States, residing at Copan, in the county of Washington and State of Oklahoma, have invented a new and useful Clamp-Stirrup, of which the following is a specification.

Our invention relates to clamp stirrups, and has for its object to provide a device in which a rod, cable, or the like, may be securely held when it is to be retained in a desired position under strain, or is to be drawn longitudinally. In accomplishing this object we have provided the improved details of structure hereinafter described and pointed out in the claims, reference being had to the accompanying drawings in which like reference numerals refer to like parts throughout the several views, and in which:—

Figure I is a perspective view of a clamp stirrup constructed according to our invention. Fig. II is an inverted detail view in perspective of the friction block. Fig. III is an enlarged detail view of the clamp head.

Referring more in detail to the parts:—1 designates the clamp head, which is preferably constructed of metal and is provided with the apertures 2 for receiving stirrup rods.

3 designates a stirrup, the rods 4 of which project through the head apertures 2 and are threaded at their ends to receive the nuts 5.

In the clamp head, between the apertures 2, is a slide channel 6, and extending through the side of the head into communication with said channel is a slot 7, the slot being of less width than the channel in order to form the keeper flanges 8. In the bottom of the channel 6 is a circular groove 9 which tapers gradually from the inner, or stirrup end of the head to the outer end.

10 designates a friction block which is adapted for coöperation with the clamp head. It comprises a body 11 which is adapted to fit slidably within the head channel 6 and a rib 12 adapted for like fit within the slot 7, the sides of the body forming shoulders which, when the parts are assembled, seat beneath the head flanges 8 and hold the block in place. In the face of block 10 is a circular groove 13 which tapers gradually from one end of the block to the other, and is adapted to overlie the head groove 9 when the parts are assembled.

In using the device, the stirrup is attached to the head so that the wider end of the groove 9 is at the stirrup end of the head. A rod or cable (not shown) is then placed within the groove 9 and the friction block inserted into the channel 6, from the stirrup end of the head, so that the wider end of the block groove will pass first over the wide end of the groove in the head channel. A hitch is made to the stirrup and the block is drawn along the rod or cable, the friction of the rod or cable against the head and sliding block drawing the former over the latter. Because of the oppositely directed taper of the grooves in the head and block, the channel formed by the two is deformed as the parts are drawn together, until the rope or cable is clamped firmly therebetween, and a continued pull on the stirrup will increase the firmness of the hold in proportion to the strength of the pull. When it is desired to remove the clamp, the outer end of the friction block is struck a sharp blow, and the block forced outwardly to reversely deform the diameter of the rope or cable channel and finally remove the block from the head so that the rod or cable may be removed.

Having thus described our invention, what we claim as new therein and desire to secure by Letters-Patent is:—

1. The combination of a head member having a slide channel and tapered groove, and a block adapted to slide in said channel and having a groove overlying the head groove.

2. The combination of a head member having a tapered groove, of a block slidable on said head member and having a groove overlying the head groove and tapered oppositely thereto.

3. The combination of a head member having a slide channel and keeper flanges overhanging said channel, and a friction block slidable within the head channel and having shoulders adapted for travel beneath said keeper flanges, said parts being provided with oppositely tapered grooves adapted for coöperation, substantially as set forth.

4. A head member having a slide channel and a slot providing outside communication with said channel and forming keeper flanges, and a friction block adapted to slide in said channel and having shoulders projected beneath said keeper flanges and a rib slidable within said slot, said head member and block being provided with oppositely tapering grooves adapted to overlie and coöperate with each other.

5. A head member having rod apertures; a slide channel provided with keeper flanges, and a tapered groove, a stirrup having rod ends removably mounted in the head apertures; and a friction block slidable within said channel and having a groove tapered oppositely to the head groove.

EDWARD J. METZGER.
JOHN A. MOORE.

Witnesses:
 FLORENCE E. BLACK,
 J. I. SHIPMAN.